United States Patent
Tarasinski

(10) Patent No.: US 6,779,618 B2
(45) Date of Patent: Aug. 24, 2004

(54) TIRE PRESSURE ADJUSTING DEVICE

(75) Inventor: Nicolai Tarasinski, Frankenthal (DE)

(73) Assignee: Deere & Company, Moline, IL (US)

( * ) Notice: Subject to any disclaimer, the term of this patent is extended or adjusted under 35 U.S.C. 154(b) by 71 days.

(21) Appl. No.: 10/084,292

(22) Filed: Feb. 26, 2002

(65) Prior Publication Data

US 2002/0121323 A1 Sep. 5, 2002

(30) Foreign Application Priority Data

Mar. 1, 2001 (DE) .......................................... 101 11 532

(51) Int. Cl.[7] .............................................. B60G 21/06
(52) U.S. Cl. .......................................... 180/41; 60/609
(58) Field of Search .......................... 180/41, 290, 291; 152/415, 416; 60/605.1, 609

(56) References Cited

U.S. PATENT DOCUMENTS

| 3,844,319 A |   | 10/1974 | Cristante |   |
|---|---|---|---|---|
| 4,763,709 A | * | 8/1988 | Scholer | ...................... 152/416 |
| 4,993,922 A | * | 2/1991 | Lauterbach et al. | ........ 417/279 |
| 5,179,981 A | * | 1/1993 | Hicks et al. | .................... 141/4 |
| 5,263,524 A | * | 11/1993 | Boardman | .................. 152/416 |
| 5,386,698 A | * | 2/1995 | Kamel | .......................... 60/603 |
| 5,587,698 A | * | 12/1996 | Genna | ......................... 340/442 |
| 5,647,927 A |   | 7/1997 | Mason |   |
| 5,857,337 A |   | 1/1999 | Kawasaki |   |
| 5,906,480 A | * | 5/1999 | Sabelstrom et al. | ......... 417/364 |
| 6,098,682 A | * | 8/2000 | Kis | ............................. 152/415 |
| 6,102,146 A | * | 8/2000 | Schmidt et al. | .............. 180/197 |
| 6,286,565 B1 | * | 9/2001 | Pike | ............................. 141/38 |
| 6,295,817 B1 | * | 10/2001 | Abthoff et al. | ................ 60/612 |

FOREIGN PATENT DOCUMENTS

| DE |   | 1 971 541 |   | 3/1969 |
| DE |   | 30 39 620 | A1 | 10/1980 |
| DE |   | 31 08 247 | A1 | 3/1981 |
| DE |   | 44 08 140 | C1 | 3/1994 |
| DE |   | 44 11 934 | C1 | 4/1994 |
| DE |   | 198 04 249 | A1 | 2/1998 |
| EP |   | 0 477 579 | A2 | 8/1991 |

* cited by examiner

Primary Examiner—Brian L. Johnson
Assistant Examiner—Christopher Bottorff

(57) ABSTRACT

A vehicle having a tire pressure adjusting device for regulating the pressure of tires which has a valve arrangement between a compressed air source and the tires is described. To reduce the energy expenditure required for filling the tires and to be able to keep the filling pressure as low as possible, the turbocharger of the vehicle engine serves as the compressed air source. The charge air channel of the turbocharger is connected with the valve arrangement.

9 Claims, 1 Drawing Sheet

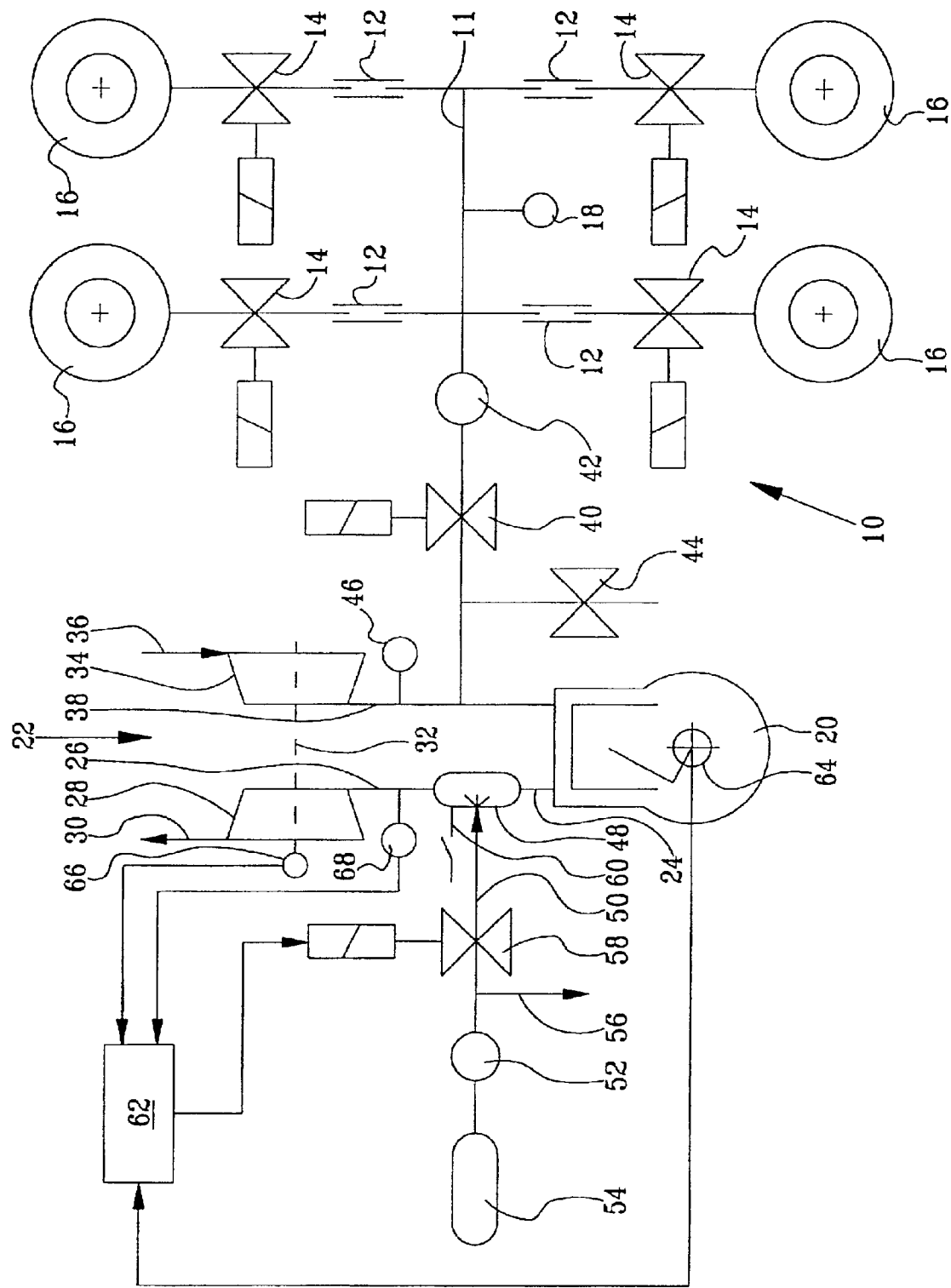

TIRE PRESSURE ADJUSTING DEVICE

BACKGROUND AND SUMMARY OF THE INVENTION

The invention concerns a tire pressure adjusting device for adjusting the pressure of tires mounted on a vehicle with a valve arrangement located between a compressed air source and the tires.

Agricultural vehicles in particular, such as tractors, combines and trailers as well as comparable vehicles that are used on soft soils are frequently equipped with large-volume tires to assure good terrain mobility, good traction properties and a low pressure on the soil. Traction and soil pressure are particularly low if low air pressure is maintained in the tires so that an operation at low tire pressure is preferred in the field. In any case, the carrying capacity of the tires decreases with decreasing tire pressure and rolling resistance and tire wear increase. Therefore, a higher air pressure should be selected during transport on solid ground. To meet these contrary requirements, tire pressure regulating devices are used, such as are evident, for example, from DE-A-198 04 249 or U.S. Pat. No. 5,647,927. With the aid of a tire pressure regulating device, the air pressure of a tire can be optimally adapted to the requirements of the work application. The air pressure required for filling the tires is produced by a compressor that supplies an air pressure tank.

To keep the filling times short, a portion of the air required for filling is generally stored under pressure in the air pressure tank, which pressure is far above the air pressure required for filling. The air pressure of the air pressure tank is reduced when required for filling the tires. Energy is lost here. The energy expenditure required for compressing the air exceeds to a high degree the energy expenditure necessary to bring the tire to operating pressure. Furthermore, an operating risk results from the air pressure tank under high pressure. This must be taken into account through special structural measures.

The compressed air is fed to the tires either through hoses that have to be connected when the vehicle is stopped and again removed, or through rotary leadthroughs in the area of the wheel axles. Sealing is problematic in the case of rotary leadthroughs because the high air pressure of the supply tank has to be sealed and the seals are subjected to high relative speeds due to fast travel speeds.

Due to the great pressure difference between the reservoir and the tires, high flow velocities arise in the supply components which, in turn, cause an energy loss. The work expended in compression to a high level cannot be recovered, rather it is expended as a throttling loss. It is not possible to reduce this energy loss with larger flow cross sections because the flow velocity would then rise also. Undesirable flow noise occurs as a negative side effect.

The problem underlying the invention is to provide a tire pressure regulating device of the above type, by which the aforementioned problems are overcome. In particular, the energy expenditure for filling the tires is to be reduced and it is possible to keep the required pressure as low as possible to avoid the problems associated with high pressures.

The tire filling and emptying device according to the invention dispenses with the use of a compressor as the pressure source. Rather, an exhaust gas turbocharger provided for supercharging the vehicle engine, which is already present in the vehicle, is used as the pressure source. It is thus not necessary to provide a compressor for the tire pressure adjusting device. The hitherto conventional supply tank can usually be eliminated. This offers considerable cost advantages.

The supercharging air channel, i.e., the outlet of the compression turbine of the turbocharger, is connected with the valve arrangement of the tire pressure adjusting device for supplying pressure to the latter. An ordinary turbocharger has a high delivery capacity, although the pressure in the charged air channel is less than the output pressure of an ordinary compressor. The components of a tire pressure adjusting device according to the invention are subjected to lower pressure loads. In particular, it is possible without cost disadvantages to construct the pressure lines with larger cross sections than previously, which can be produced at low cost, possibly of plastic. Due to the lower operating pressure, operating dangers can be avoided and the sealing of rotary leadthroughs can be designed less expensively. Flow velocities are relatively low in the large line cross sections, which works out favorably for noise suppression.

By dispensing with the conventional high compression of the compressed air, throttling losses can be substantially reduced, such that the energy expenditure for filling the tires can also be sharply reduced.

At least one connecting valve is preferably located between the charge air channel of the turbocharger and the distributor lines leading to the tires. An electrically, especially electromagnetically regulated valve can be involved, which is opened only when the tires are to be filled. Such a connecting valve can be opened as a function of electric signals to raise or lower the pressure in the distributor lines. In the absence of an electric signal, the valve is closed. For the normal operation of the work vehicle, the turbocharger can be separated from the tire filling device and avoid a mutual influence.

It is also advantageous to connect a waste gate valve (see, e.g., U.S. Pat. No. 5,857,337) to the charge air channel of the turbocharger. The waste gate valve is used to adjust the operating point of the internal combustion engine optimally if the function of tire filling is not being used at the moment. The connecting valve and the waste gate valve can possibly be combined into one valve unit.

It may be possible that the rpm of the turbocharger is not sufficient under all operating conditions of the engine to produce a pressure that is above the desired tire pressure. To raise the turbocharger rpm and to produce a sufficient amount of air at an adequate air pressure, a preferred refinement of the invention proposes an exhaust gas reheating device that is expediently designed so that, if necessary, fuel is fed, ignited and burned in a combustion chamber of the exhaust gas train of the turbocharger, especially in the region in front of the turbocharger exhaust gas turbine.

The reheating device serves not only to assure an adequate pressure for the tire filling device, but can also serve in a particularly advantageous manner if the tire filling device is not used, to increase the charge pressure, to increase the capacity or the torque of the engine running at a lower rpm. This is particularly advantageous during accelerations of the work vehicle.

The amount of fuel supplied to the combustion chamber is preferably adjusted as a function of the rpm of the internal combustion engine, the rpm of the turbocharger and/or the temperature of the exhaust gas entering into the exhaust gas turbine. If there is no rpm sensor for detecting the turbocharger rpm, the turbocharger rpm or a comparable value can be calculated from the measured temperatures and pressures of the turbocharger. The amount of fuel supplied to the exhaust gas train is limited so that a prescribed turbocharger rpm is not exceeded. In particular, the amount of fuel supplied to the exhaust gas is selected so that the air used to fill the tires is not compressed more than is required to overcome the flow resistances.

It is advantageous to monitor the turbocharger rpm and shut off the energy supply to reheating when the rpm exceeds a prescribed value in order to avoid destruction of the turbocharger due to overspeeding. It is also expedient to monitor the combustion to avoid emission into the atmosphere of unburned fuel supplied to the exhaust gas train when the ignition is not working properly.

Another advantageous design utilizes an electric machine that can be coupled to the turbocharger to produce the required rpm of the turbocharger during the filling of the tires. It is also possible with this arrangement to increase the charge pressure when the tire filling device is not in use.

A pressure transducer that detects the pressure in the charge air channel is advantageously provided to measure the air pressure generated by the turbocharger.

The pressure in the charge air channel that is already provided for the tire pressure regulating device is dependent on the volume flow produced by the charge air compressor at a prescribed engine rpm in the characteristic manner. The pressure first increases with an increasing volume flow, then reaches a maximum and again drops at high volume flows. For different engine rpm's the maximum pressure is shifted and is at different volume flow values. To assure an adequate pressure for filling the tires, an advantageous refinement of the invention is proposed, i.e., holding the rpm of the internal combustion engine within prescribable boundary values during the filling and/or emptying process. The rpm boundary values are selected so that the turbocharger operates in the range of its maximum pressure.

It is conceivable that the pressure generated by the turbocharger is not always sufficient in particular applications of the invention to be able to undertake the tire filling in an optimal manner. To remedy this, a preferred refinement of the invention proposes to provide a supplementary compressing device that further increases the pressure of the compressed air generated by the turbocharger. An appropriately designed compressor that is located between the turbocharger and the tire filling valve arrangement can be used as the supplementary compressing device.

The invention and additional advantages and advantageous refinements and implementations of the invention are described in more detail and elucidated in the following on the basis of the drawing that shows an exemplary implementation of the invention.

BRIEF DESCRIPTION OF THE DRAWING

The single FIGURE shows a schematic representation of a tire pressure adjusting device according to the invention in connection with the turbocharger of the engine of a work vehicle.

DETAILED DESCRIPTION OF THE PREFERRED EMBODIMENT

The tire pressure adjusting device 10 shown on the right-hand side of the FIGURE contains a distributor line 11, also called the pressure line, that is connected through a rotary leadthrough 12 and an accessory valve 14 to each of the four tires 16 of a work vehicle (not shown). The rotary leadthroughs 12 and the valves 14 can be designed in the usual manner. For example, the valves 14 can be directional control valves. An additional valve arrangement in front of the leadthroughs can also be provided for preparing the supply pressure, but it was not shown because it is not the object of the present invention. A pressure measuring site 18 is provided in the pressure line 11.

An internal combustion engine 20 is denoted on the left-hand side of the FIGURE; it is equipped with an exhaust gas turbocharger 22. The exhaust gas train 26 of the turbocharger 22 is connected to the manifold 24 of the engine 20. The exhaust gas turbine 28 of the turbocharger 22 lying in the exhaust gas train 26 is driven by the engine exhaust, which passes into the atmosphere through the exhaust pipe 30. The exhaust gas turbine 28 drives the charge air compressor 34 of the turbocharger 22 through a shaft 32.

The charge air compressor 34 draws fresh air from the atmosphere through the inlet 36, compresses it and passes it through a charge air channel 38 to the engine 20.

The charge air channel 38 is connected through a connecting valve 40 and a supplementary compressor 42 with the pressure line 11 of the tire pressure adjusting device 10. The supplementary compressor 42 is superfluous in most applications because the turbocharger 22 is usually capable of preparing a sufficiently high pressure for the tire pressure adjusting device 10. If necessary, an ordinary compressor can be used as the supplementary compressor 42. The connecting valve 40 can be controlled electromagnetically and is closed if there is no electric signal. It can be designed as a pressure regulating valve for an optimal adjustment of the compressor for the tire pressure adjusting device 10.

A so-called waste gate valve 44 is connected to the charge air channel 38, by which the operating point of the engine 20 can be optimally adjusted. A pressure sensor 46 is provided for monitoring the pressure in the charge air channel 38; its pressure signals are used to adapt the engine rpm. If a tire filling occurs, the engine rpm is adjusted so that the turbocharger 22 has a sufficient filling pressure available.

A combustion chamber 48 is integrated into the exhaust gas train 26 in the vicinity of the manifold 24. A nozzle connected with a fuel line 50 empties into the combustion chamber 48. The fuel pump 52 of the work vehicle, which supplies fuel from a fuel tank 54 for the injection pump 56 (not shown) of the engine 20, also delivers fuel to the fuel line 50. A fuel valve 58 located in the fuel line 50 controls the fuel flow to the nozzle. If the fuel valve 58 is opened, an ignition device 60 is simultaneously activated to ignite the fuel emerging from the nozzle into the combustion chamber 48 so that the fuel burns and further heats the exhaust gas exiting the engine 20.

The fuel valve 58 is actuated electromagnetically and controlled through an electric control device 62. The control device 62 receives signals from an rpm sensor 64 that detects the engine rpm, a turbocharger rpm sensor 66 and a temperature sensor 68 that detects the exhaust gas temperature in the exhaust gas train 26 following the combustion chamber 48.

At a low engine rpm, the control device 62 controls the fuel valve 58 as a function of the turbocharger rpm, to effect a reheating of the engine exhaust and to hold the turbocharger rpm at a minimum value. If the temperature sensor 68 should signal an excessively high exhaust gas temperature, the fuel valve 58 is closed. The signal of the temperature sensor 68 can also be used to determine whether the ignition device 60 is operating correctly, if no corresponding increase in the exhaust gas temperature is detected with an open fuel valve 58, the fuel is obviously not ignited. In this case, the control device 62 closes the fuel valve 58 to avoid loading the exhaust gas with unburned fuel.

The control device 62 may also detect the output signals of the pressure sensor 46 in order to control the fuel valve 58 and with it the reheating of the exhaust gas. With decreasing pressure in the charge air channel 38, the fuel valve 58 is opened to increase the combustion and to accelerate the turbocharger. With increasing pressure in the charge air channel 38, the fuel valve 58 is closed to decrease the combustion and to decelerate the turbocharger.

Although the invention was described with only one implementation example, many different alternatives, modifications and variants that fall under the following claims are revealed to a person skilled in the art in light of the above description.

What is claimed is:

1. A vehicle comprising:
   an internal combustion engine;
   a turbocharger having an exhaust turbine in an exhaust train from the engine and a charge air compressor driven by the exhaust turbine;
   a charge air channel between the compressor to the engine;
   one or more pneumatic tires; and
   a tire pressure adjusting device for adjusting the pressure of tires comprising:
      a fluid connection between the charge air channel and the tires;
      a waste gate valve connected to the charge air channel; and,
      a valve in the fluid connection between the charge air channel and the tires which when open allows communication between the charge air channel and the tires whereby the turbocharger serves as the compressed air source for increasing the pressure in the tires.

2. The vehicle as defined by claim 1 further comprising distribution lines from the valve to each tire and individual tire valves in each distribution line.

3. The vehicle as defined by claim 1 further comprising an exhaust gas reheating device in the exhaust gas train before the exhaust gas turbine.

4. The vehicle as defined by claim 3 wherein the exhaust gas reheating device contains at least one combustion chamber in which fuel can be burned.

5. The vehicle as defined by claim 4 further comprising a fuel feed to the combustion chamber including a fuel valve to control the flow of fuel to the combustion chamber.

6. The vehicle as defined by claim 4 wherein the amount of fuel fed to the combustion chamber is adjustable as a function of the engine rpm, the turbocharger rpm and/or the temperature of the exhaust gas air entering the exhaust gas turbine.

7. The vehicle as defined by claim 1 further comprising a temperature sensor located in the exhaust gas train before the exhaust gas turbine.

8. The vehicle as defined by claim 1 further comprising a pressure sensor operable to detect the pressure in the charge air channel.

9. The vehicle as defined by claim 1 further comprising a secondary compression device to further increase the pressure of the compressed air generated by the turbocharger.

* * * * *